United States Patent [19]

Dively et al.

[11] Patent Number: 4,768,227
[45] Date of Patent: * Aug. 30, 1988

[54] COIL OPERATED TELEPHONE

[75] Inventors: Lee V. Dively; Jack M. Grubbs, both of Tulsa, Okla.

[73] Assignee: Seiscor Technologies, Inc., Tulsa, Okla.

[*] Notice: The portion of the term of this patent subsequent to Oct. 6, 2004 has been disclaimed.

[21] Appl. No.: 67,656

[22] Filed: Jun. 29, 1987

Related U.S. Application Data

[62] Division of Ser. No. 714,771, Mar. 22, 1985, Pat. No. 4,698,840.

[51] Int. Cl.$^4$ ............................................. H04M 17/06
[52] U.S. Cl. ..................................... 379/112; 379/132; 379/155; 379/130
[58] Field of Search ................ 379/112, 132, 155, 145, 379/146, 150, 91, 144, 130

[56] References Cited

U.S. PATENT DOCUMENTS

| | | | |
|---|---|---|---|
| 3,221,101 | 11/1965 | Clark, Jr. | 179/6.31 |
| 4,045,619 | 8/1977 | Harrington | 379/200 |
| 4,122,308 | 10/1978 | Weinberger et al. | 179/7.1 R |
| 4,136,264 | 1/1979 | Clark, Jr. | 179/6.3 R |
| 4,198,545 | 4/1980 | Haist et al. | 179/6.31 |
| 4,199,659 | 4/1980 | Lischin | 179/6.3 R |
| 4,429,188 | 1/1984 | Allen | 179/84 C |
| 4,439,636 | 3/1984 | Newkirk et al. | 379/123 |
| 4,538,028 | 8/1985 | Gazzoli et al. | 179/2 EA |
| 4,698,840 | 10/1987 | Dively et al. | |

FOREIGN PATENT DOCUMENTS 2105149 3/1983 United Kingdom ............. 179/6.3 R

OTHER PUBLICATIONS

"Private Coinphones: Gold at the End of the Rainbow?" by J. P. Newport et al, Telephone Engineer & Management, vol. 89, pp. 12(1), Jul. 15, 1985.

"The Seiscor Coin Telpehone", Seiscor, Inc., Product Brochure.
Adolphs, "NT 2000 Coin Telephone Using MIcroprocessor Techniques", Electrical Communication, vol. 52, No. 3 (1977), pp. 213-218.
Moore, "Portable Coin-Collecting Box for Renter's Use", Post Office Electrical Engineers' Journal, vol. 69, pt. 4, pp. 265-266 (1977).

Primary Examiner—Robert Lev
Attorney, Agent, or Firm—William R. Clark; Richard M. Sharkansky

[57] ABSTRACT

A self-contained, pre-pay coin operated telephone wherein when the user removes a handset from a switchhook, a local dial tone is generated, prompting the user to enter a telephone number of a called party. Once the first digit of that telephone number has been entered, the locally generated dial tone is removed and the user completes the entry of the telephone number. Once the proper coin has been deposited, the internal computer causes the telephone to couple itself to a central office. The telephone number entered by the user is then sent to the central office under control of the internal computer. During this time, the microphone in the handset is muted such that the user cannot communicate through the telephone. Once the user hears the called party answering, then the user must actuate a push-to-talk switch to indicate to the computer that the party has answered. Once this occurs, the muting is disabled allowing the user to speak to the called party and deposited coins are retained at the termination of the call. If the call is terminated without the push-to-talk switch being actuated, then deposited coins are returned to the user. Restricting incoming calls to prevent the user from accepting collect calls is accomplished by the phone answering the incoming call of approximately one second, then automatically dropping the incoming call, thereby readying the telephone for initiation of an outgoing call. Alternatively, a minimum charge, or no charge, can be required to answer an incoming call.

6 Claims, 9 Drawing Sheets

COIL OPERATED TELEPHONE

This application is a divisional of co-pending U.S. application Ser. No. 06/714/771 filed Mar. 22, 1985 now U.S. Pat. No. 4,698,840.

BACKGROUND OF THE INVENTION

This invention relates generally to coin operated telephones, and more particularly, to coin operated telephones having self-contained control circuitry.

Coin operated telephones are typically of the type that have a central office controlling the operation of the coin operated telephone. When a user wishes to use this type of telephone, the user deposits a minimum amount (typically 10 cents), dials a telephone number of a called party, and a central office enables completion of the call once the minimum cost of the call has been satisfied, determines how much that call will cost beyond the minimum amount already deposited, and advises the caller of any added cost to allow continuation of that call. When the called party answers, the user can immediately speak with the called party. The minimum cost coins and additionally deposited coins are collected, or returned, under the control of the central office. For example, if the called party does not answer, or if the called telephone is busy, the deposited coins are returned. Signals from the central office which enable collection or return of deposited coins are not provided on all telephone lines emanating from a central office, but are provided typically to only those telephone lines running from the central office to central office owned coin operated pay phones. With telephone rate deregulation it is now permissible in many areas to have private ownership of coin operated telephones. Thus, one may purchase his or her own coin operated telephone, install it in his or her own place of business, as a restaurant, for example, and connect it to the conventional telephone line running into such place of business. Such purchased pay phones have self-contained control and thus have means, internal to the telephone, to compute required coin deposits and to control whether deposited coins should be collected or returned. In one such self-contained pay phone, the coin operated telephone is initially coupled to the central office when the user removes a handset from a switchhook so that a dial tone may be supplied from the central office to prompt the user to enter the telephone number of a called party. Once digits of the telephone number are entered, the phone is decoupled from the central office and the telephone number entered is stored in the telephone. The minimum charge for the call is calculated by means within the telephone and once the user satisfies that charge by depositing coins, the connection to the central office is reestablished by control circuitry within the phone. Then the stored telephone number is dialed by the circuitry within the phone to the central office. When the called party answers, deposited coins are retained, otherwise, they are returned. Detection of the answering by the called party can be accomplished electrically by detecting a momentary reversal in the voltage generated by the central office (a so-called "line reversal" ), but momentary line reversal is not provided by all central offices, so in one known telephone of this type, the user is required to activate a switch when he or she hears the voice of the called party and activation of the switch enables coin collection. That is, if such switch is not activated and the called party answers, the user's audio transmission is muted so that the called party is unable to hear the voice of the user. Thus, for the called party to hear the caller, the switch must be activated and it is the activation of the switch which causes, ultimately, the collection of the deposited coins. If, however, the switch has not been actuated by the time the user replaces the handset onto the switchhook, as when the called party does not answer, or if the called telephone is busy, the coins are returned. In either case, a central office is still required at the initiation of the call to provide a local dial tone to prompt the caller to enter the desired telephone number and this requires a coupling of the phone to the central office. Hence, the central office is used twice, once to just provide a dial tone and another to complete the call.

In a private branch exchange (PBX), there is provided a local dial tone generator, located within the PBX, to prompt telephone number of a called party or an access code to couple the user's telephone to a central office. All control over the operation of the telephone coupled to the PBX is controlled by that PBX and not by circuitry disposed internally to the telephone. Further, PBX's are not designed to couple to coin operated telephones. Therefore, conventional coin operated telephones as described above are not generally coupled to a PBX.

Another problem with self-contained pay phones is that it is generally desirable to prevent the user (typically a patron in the telephone owner's place of business) from accepting collect calls which will in effect be charged to the owner of the phone. Two approaches are generally used: restricting indication of incoming calls by circuitry within the phone; or, by alerting an operator that the accepting party (the patron/user) is accepting the call from a coin operated telephone. Restricting indication of incoming calls has been generally limited to disabling an indicator (i.e., the ringer) in the phone to prevent the user of the coin operated telephone from knowing that a call is incoming; however, the user can circumvent this feature by coordinating with a caller the time at which the caller will call so that at the appropriate pre-arranged time the user will remove the handset from the coin operated telephone, answer the call, and accept the "reverse" or collect charges. Some coin operated telephones include circuitry which attempts to alert an operator (if it is a collect call) that the answering telephone is a coin operated telephone and no charges are to be accepted by the telephone transmitting a short tone to the operator. If the operator should miss hearing the tone burst or not know what the tone means, the operator could allow the call. Obviously, neither approach provides a positive method of preventing incoming calls from being charged to the owner of the phone.

SUMMARY OF THE INVENTION

In accordance with the present invention, a coin operated telephone is provided having a handset with an earpiece, a switchhook for receiving the handset and for enabling removal of the handset from the switchhook, a dial tone generator disposed at the coin operated telephone, means for electrically coupling the dial tone generator to the earphone when the handset is removed from the switchhook and electrically decoupling the dial tone generator from the earphone upon entry of a telephone number of the called party, and means for enabling coupling of the coin operated telephone to a telephone of the called party after a predetermined amount of coins have been deposited by a user.

In accordance with the invention, a method of operating a coin operated telephone is provided comprising the steps of: internally generating a dial tone when a handset is removed from a switchhook signaling to the user to enter a telephone number of a called party; muting audio transmission by the user while allowing audio reception by the user; enabling completion of the call once the user has deposited a predetermined amount of coins into the telephone; and, allowing audio transmission by the user and collecting deposited coins once the called party has answered, otherwise, returning the deposited coins upon replacement of the handset onto the switchhook if the called party did not answer the call.

With such apparatus and method, the central office is not needed to provide a dial tone at the initiation of the call, but only to comple.te the call. The coin operated telephone, therefore, does not require coupling to the central office at the initiation of the call and again coupling to the central office to complete the call.

In accordance with an additional feature of the coin operated telephone, there is provided: means for generating an incoming call signal; and, means responsive to the incoming call signal, for completing the incoming call for a predetermined time and after such predetermined time, terminating the incoming call. The predetermined time is relatively short to, in effect, prohibit any incoming calls being answered or any "reverse charges" or collect calls being accepted by the called party.

BRIEF DESCRIPTION OF THE DRAWINGS

The foregoing features of the present invention, as well as the invention itself, may be more fully understood from the following detailed description of the drawings, in which.

DESCRIPTION OF THE PREFERRED EMBODIMENT

Figure 1:
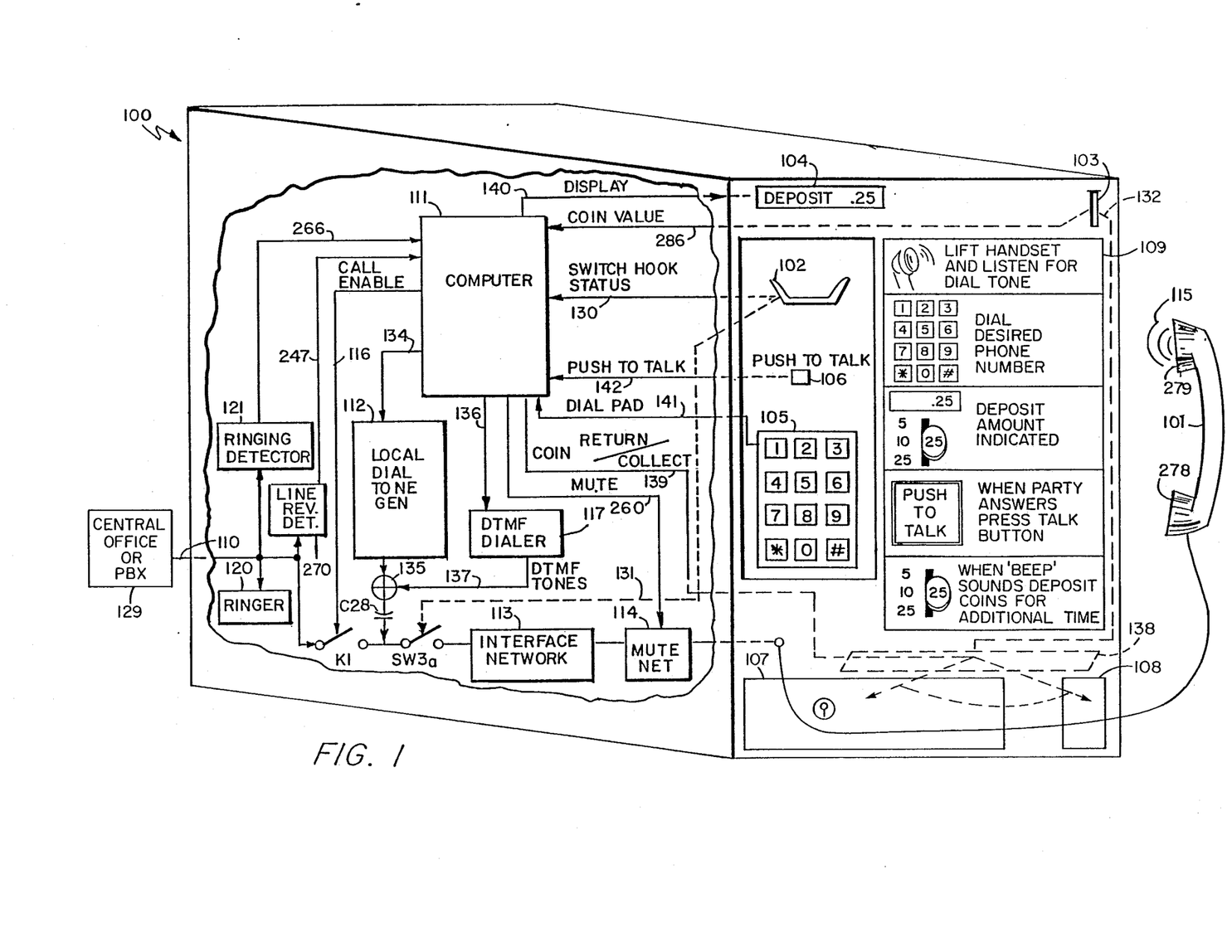
FIG. 1 is a diagrammatical sketch of a coin operated telephone according to the invention, such telephone being shown partially broken away to show a block diagram of the internal circuitry of the coin operated telephone.

Referring first generally to FIG. 1, a coin operated telephone 100 is provided having internal, or self-contained control of its operation. When a user of the coin operated telephone 100 removes a handset 101 from a switchhook 102, switch SW3a closes and a local dial tone is generated by local dial tone generator 112, prompting the user to enter a telephone number of a called party into a dial pad 105. Once the first digit of that telephone number has been entered, the locally generated dial tone is removed and the user completes the entry of the telephone number. An internal computer 111 then calculates the minimum charge and the minimum time period for that call, and displays that minimum charge on a display 104 to prompt the user to deposit coins via coin slot 103 for that call. To help the user keep track of the amount of coins deposited, the display value is decremented by the value of the coins deposited. Once the display value reaches zero, then the internal computer 111 causes the coin operated telephone 100 to couple itself to a telephone line 110, via a switch K1, which in turn, couples to a central office or a private branch exchange (PBX). After a two second delay, the telephone number entered by the user is sent to the central office by a dialer 117 under control of the internal computer 111. It is noted that even though switches K1 and SW3a are closed, during this time the microphone 278 on handset 101 is muted via mute network 114 such that the user cannot communicate through the coin operated telephone 100. However, once the user hears the called party answering, he or she must actuate a push-to-talk switch 106 to indicate to the computer 111 that the called party has answered and to disable mute network 114 to allow the user to speak to the called party. Further, the computer 111 now allows the coin operated telephone 100 to collect any coins deposited into coin box 107 at the termination of the call. If the call is terminated without the push-to-talk switch 106 being operated, deposited coins are returned to the user via coin return box 108. Once the push-to-talk switch 106 has been manually operated, mute network 114 is activated to enable the user's audio transmission to be transmitted to the central office via switches K1, SW3a, and also to enable the display 104 to indicate the amount of time available to the user for that call. At any time during that call, the user may deposit coins to purchase time in units of predetermined intervals, typically one minute intervals. This interval is determined by the central office's billing system in which time used for measuring a call has a predetermined granularity. That granularity is typically one minute, but could be 6 seconds. It is noted that by buying time in units of the predetermined intervals, an owner of the coin operated telephone 100 will not be billed for a time period not completely paid for, e.g., if the user pays for four minutes (three minutes plus one minute) and the call is terminated when three and a half minutes are up, the owner of the coin operated telephone 100 will be billed for four minutes, not three and a half. While the call is in progress, the display time is decremented in real time and once a warning tone threshold is reached, typically 20 seconds, a warning tone is sent to the user indicating that more money is to be deposited or the call will terminate once the time reaches zero. Once the time does reach zero, the call is terminated, deposited coins are collected, and after the handset 101 has been placed back on switchhook 102, the coin operated telephone is readied for the initiation of another call. If the user should place the handset 101 onto switchhook 102 after manual operation of the push-to-talk switch 106, deposited coins are collected even though there remains time available to the user. If there is an incoming call to the coin operated telephone, as detected by ringing detector 121, and no incoming calls are allowed, when the user tries to answer the incoming call, the call is completed for a predetermined time, typically one second (but generally a sufficiently short to prevent the called party from accepting the call), and then terminated thereby readying the coin operated telephone for the initiation of an outgoing call. However, if the telephone is used to allow incoming calls, but a charge is to be made for answering them, when the user answers the incoming call, the coin operated telephone 100 prompts the user to deposit a minimum charge on the display 104 while muting transmission by the user to the calling party and allowing the user to hear the calling party. When the user deposits that minimum charge, the muting is removed, and conversation can begin. It is noted that answering an incoming call for a minimum charge can be timed or untimed. For example, if the call is to be untimed, there is no time limit nor an extra charge associated with the length of time the user uses the coin operated telephone 100, but if it is to be timed, then time limits are set and an extra charge is required for time exceeding that time limit as described above for originating a call. Alternatively, if no charge is to be made for answering an incoming call, the call is immediately answered once the user removes the handset 101 from the switchhook 102.

Referring in more detail to FIG. 1, the coin operated telephone 100 includes a handset 101, a switchhook 102 which holds handset 101 when the coin operated telephone 100 is not being used, a coin slot 103, a display 104, a dial pad 105, a push-to-talk switch 106, a coin box 107, a coin return slot 108, and an instruction card 109 providing instructions on the use of the coin operated telephone 110. The telephone line 110 typically consists of a pair of wires which couple to a central office or a PBX to provide a talking path for the coin operated telephone 100 to that central office or PBX. When a user desires to use the coin operated telephone 100, the user would lift handset 101 from the switchhook 102 thereby signaling to computer 111 via the switchhook status signal 130 that the user wishes to place a telephone call, and simultaneously closes switch $SW3_a$ which is mechanically coupled to switchhook 102 by coupling 131. Computer 111 then enables local dial tone generator 112, disposed internal to the coin operated telephone 100, to generate a local dial tone signal which is coupled, via summer 135, capacitor C28, switch $SW3_a$, interface network 113, muting circuit 114 and handset 101, to earphone 279, thereby producing a local dial tone 115 to the user. This local dial tone 115 indicates to the user to enter a telephone number into dial pad 105. Concurrently, display 104 would signal the user to enter a telephone number. As the user enters the telephone number, the display 104 indicates the digits that are entered. These digits entered into dial pad 105 are coupled via bus 141 to computer 111 and stored therein. When the user has finished entering the telephone number, computer 111 calculates the minimum charge for the desired call and displays that charge on display 104. The user then deposits coins into coin slot 103 until the amount of coins deposited, signaled back to computer 111 via bus 286, equaled the amount displayed on display 104. The deposited coins fall through path 132 into escrow unit 138 (shown in phantom) until, at termination of the call, it is determined by the computer 111 that the coins are to be returned by a signal which is produced on bus 139. To aid the user in depositing the right amount of coins into slot 103, the charge displayed by display 104 is decremented by the amount that the user deposits into coin slot 103 until the amount to be deposited as displayed by display 104 reaches zero. Once display 104 indicates that the value to be deposited is less than or equal to zero, then a call enable signal on wire 116 closes switch K1, enabling coupling of the coin operated telephone 100 to the telephone of the called party, thereby completing the circuit to the central office via telephone line 110. After a two second delay, the telephone number that was entered into dial pad 105, which is stored in computer 111 is dialed out to the central office either by Dual Tone Multi Frequency (DTMF) dialer 117 or by computer 111 pulsing call enable signal on wire 116 so that switch K1 pulses out the dialed number. During this time, muting network 114, for selectively muting a microphone 278 in the handset 101, is enabled so that audio transmission through the coin operated telephone 100 is inhibited, but the user can hear busy signals, ring back, intercepts, or the called party answering. Once the called party answers, in order to allow audio transmission by the user through the coin operated telephone 100 to the called party, the user must press the push-to-talk button 106, a manually operated button and coupled to computer 111 via bus 142, so that the mute network 114 is disabled to thereby allow the user's audio to pass through handset 101 to the called party. Simultaneously, a flag is set in computer 111 to collect coins held in escrow unit 138 into coin box 107 when the call is terminated. If, on the other hand, the called party had not answered or is busy, and the user had not pressed the push-to-talk switch 106, then when the user returns the handset 101 back on switchhook 102, and coins held in the escrow unit 138 are returned to the user via coin return slot 108. It is noted that some central offices provide a signal coupled to the central office that the called party has answered. If this signal is provided, then the push-to-talk switch 106 would not be needed as the computer 111 would be informed automatically that the called party has answered. To detect this signal, line reversal detector 270 detects this and generates a signal on wire 247 to computer 111. Interface network 113, which is well-known in the art, couples the telephone line 110 to the handset 101 so that side-tone, heard in earphone 279, created by the user speaking into microphone 278 is suppressed. When a call is incoming, the central office impresses across telephone line 110 a high voltage signal to which ringer 120 responds, indicating that a call is incoming, and ringing detector 121 produces an incoming call signal 266 to indicate to the computer 111 that a call is incoming. When the user of the coin operated telephone 100 wishes to answer that call, the user lifts handset 101 from switchhook 102 and the computer 111 responds to the incoming call signal. The computer could be programmed with 3 options: (a) answer an incoming call upon deposit of a minimum charge; (b) unrestricted answering of incoming calls (the call is free); and (c) prohibit incoming calls. If option ("a") is programmed in, the display 104 indicates to the user the charge to answer the call and to deposit coins so that the mute network 114 would be disabled allowing the user to talk. With option ("b"), no charge for completing the call, the muting network 114 is disabled immediately allowing the user to speak to the calling party. If option ("c") is programmed so no incoming calls are allowed, the computer 111 closes switch K1, it being noted that switch $SW3_a$ closed because of handset 101 being off-hook from switchhook 102, thereby completing the loop to the central office or PBX via telephone line 110. However, a predetermined time later, typically one second, the computer 111 opens switch K1 so that the incoming call to the coin operated telephone is completed and after a predetermined time is automatically terminated so that an outgoing call can be placed as described above.

Figure 2:
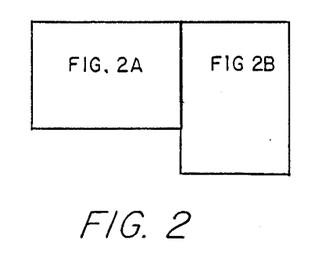
FIG. 2 diagrams the relationship between FIGS. 2A and 2B.
Figure 2A:
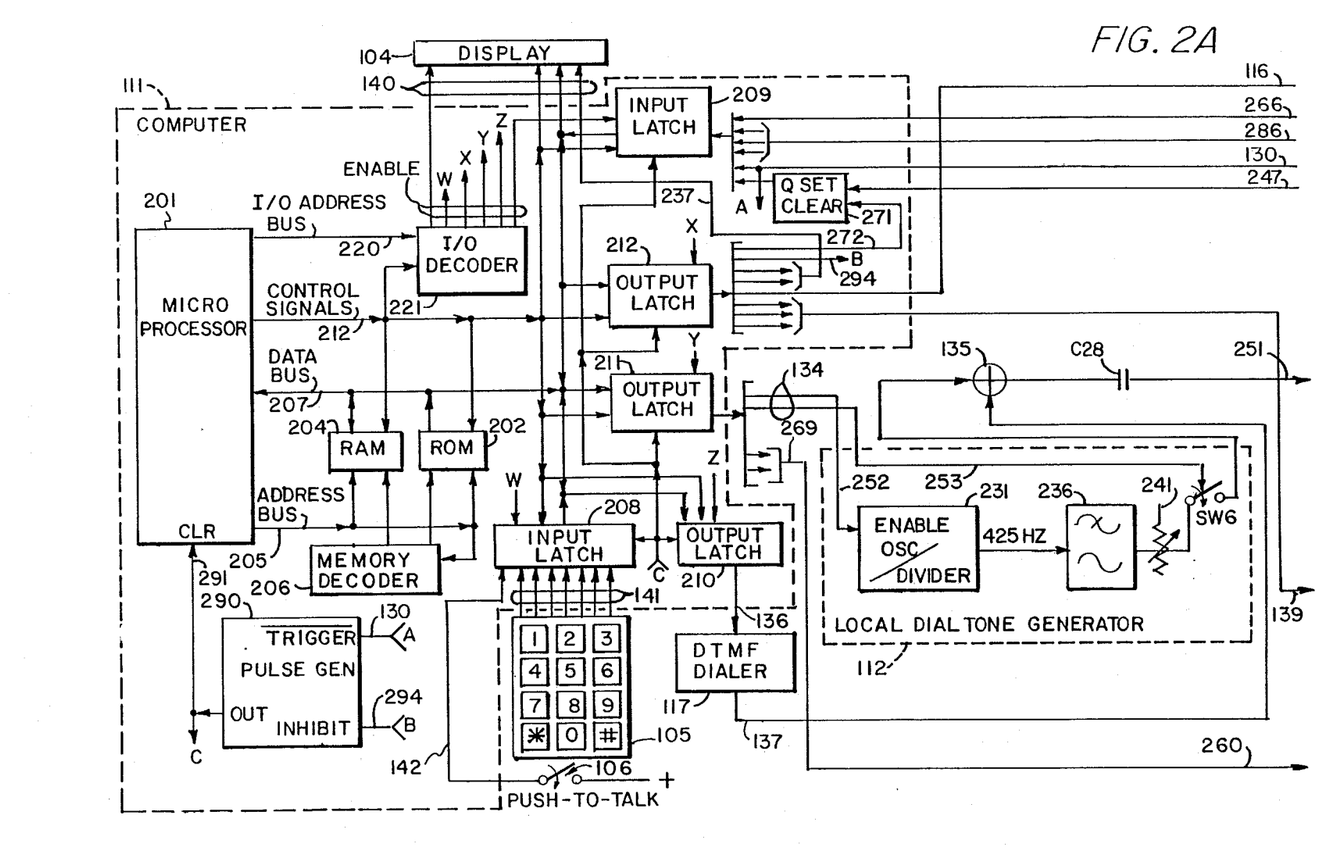
FIGS. 2A and 2B are detailed block and schematic diagrams of the internal circuitry of the coin operated telephone.
Figure 2B:
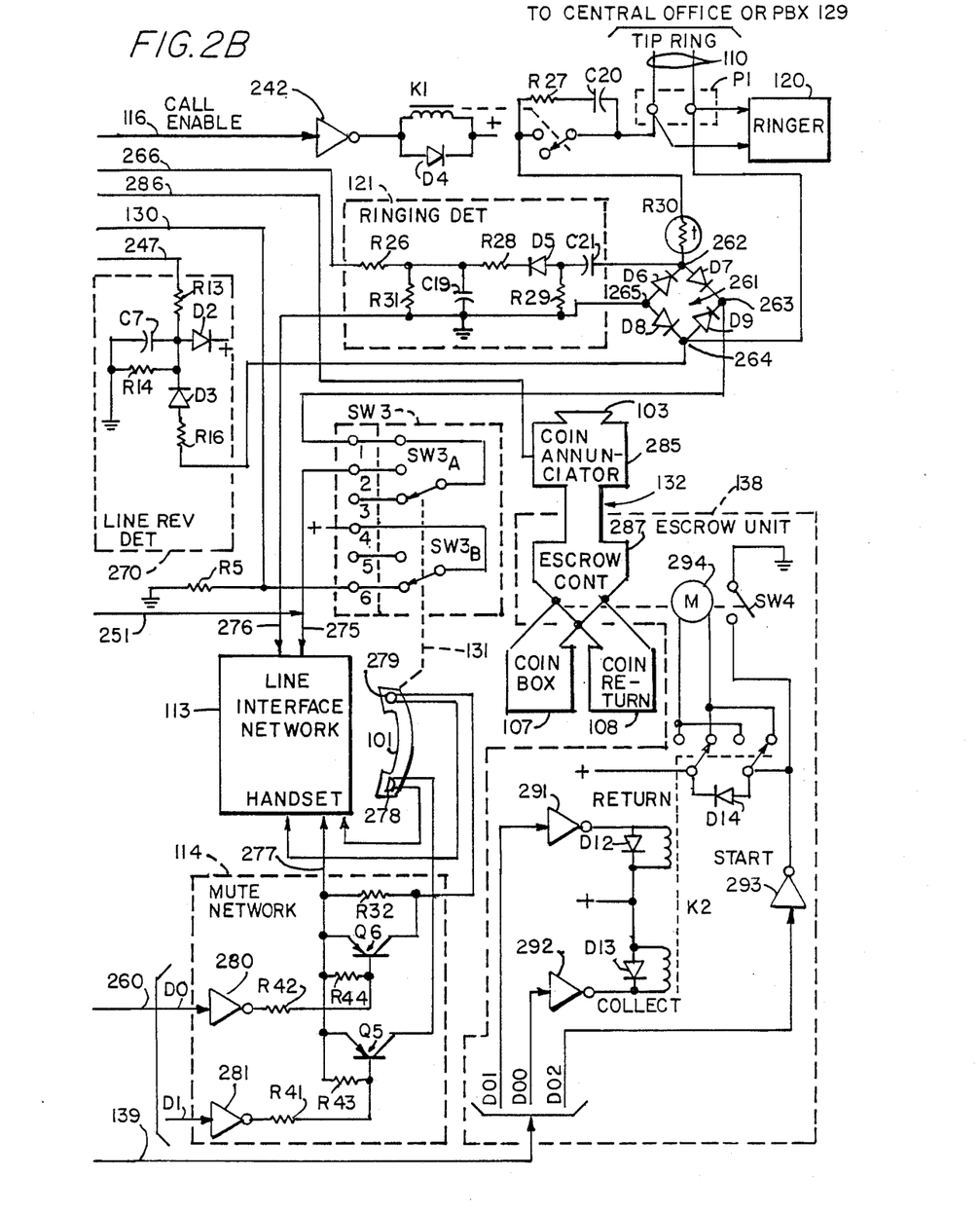

Referring to FIGS. 2, 2A and 2B, computer 111 is shown to include a microprocessor 201, here Model 1802 manufactured by Radio Corporation of America (RCA), which controls the operation of the coin operated telephone. Read only memory (ROM) 202 contains a program, as detailed in FIGS. 3, 3A-3E, and described below, which defines the operation of the coin operated telephone. ROM 202 also contains data which the program uses during operation of the coin operated telephone. Random access memory (RAM) 204, used to store or retrieve data, is used by the program to store transient information necessary for the correct operation of the telephone. Address bus 205 couples address signals generated by microprocessor 201 to RAM 204, ROM 202, and memory decoder 206. Memory decoder 206 enables either the RAM 204 or the ROM 202 depending upon the address supplied by the microprocessor 201 via the address bus 205 so that RAM 204 and ROM 202 will not be enabled at the same time. Data to and from microprocessor 201 is coupled via data bus 207. Data bus 207 couples to RAM 204, ROM 202, input latches 208 and 209, output latches 210, 211 and 212, and to display 104. Control signals 212, generated by microprocessor 201, include read, write and timing signals necessary for all devices coupled to the data bus 207 to properly operate with that data bus 207. I/O address bus 220 couples an address generated by microprocessor 201 to I/O decoder 221 during input or output operations of microprocessor 201, so that devices coupled to data bus 207 can be uniquely accessed by the microprocessor 201 during input or output operations. For example, during an input operation, microprocessor 201 generates an address which couples via I/O address bus 220 to I/O decoder 221 to enable one of the input latches (208, 209) to couple data presented to that latch onto the data bus 207 for coupling back to microprocessor 201. Also, by way of example, during an output operation, microprocessor 201 would generate an address which is coupled via I/O address bus 220 to I/O decoder 221 to enable an output device (output latches 210, 211, 212 or display 104) to couple data from microprocessor 201 via data bus 207 to the enabled output device.

Display 104 is here a conventional alphanumeric liquid crystal display (LCD). It is controlled by computer 111 through bus 140, being coupled to the data bus 207, control bus 212, I/O decoder 221 via an enable and output latch 212 via bus 237. Signals carried over cable 237 control the operation of display 104 and data to be displayed is coupled to display 104 by data bus 207.

Summer 135 combines locally generated dial tone from oscillator/divider 231 and DTMF signals from DTMF dialer 117 together. It is well-known in the art to include other tone oscillators for indicating coin deposits on collect and operator assisted calls. Outputs from these oscillators, if provided, would couple to summer 135. Oscillator/divider 231 provides a 425 Hz output for a local dial tone. The 425 Hz output of oscillator/divider 231 passes through a low pass filter 236, then through attenuator 241 to be selectively coupled by switch SW6 to summer 135. Tones from the DTMF dialer 117 are coupled to summer 135 by wire 137. The output of summer 135 passes through DC blocking capacitor C28 to wire 251. A signal on wire 252 enables oscillator/divider 231 and a signal on wire 253 enables the 425 Hz output of oscillator/divider 231 to be coupled to summer 245 by closing switch SW6. Thus, the local dial tone generated by local dial tone generator 112 would be coupled to earphone 279 (FIG. 2B) once switch SW3$_a$ is closed, and DTMF signals for dialing a telephone number to a central office is coupled to the telephone line 110 when switch K1 is closed.

The telephone line 110 (FIG. 2B) coupling to a central office or PBX (not shown) provides a talking path to a called party for the user of the coin operated telephone 100. This telephone line 110 consists of a pair of wires, first of the pair of wires designated TIP and second of the pair of wires designated RING. Coming from the central office or PBX, the telephone line 110 couples to a terminal strip P1 in the coin operated telephone 100. The TIP wire of the telephone line 110 couples through normally open switch K1 to thermistor R30. Switch K1 controls the coupling of the coin operated telephone to the central office. Therefore, calls can only be completed by K1 being closed. An enable signal on wire 116, from output latch 212, drives inverting buffer 242 to drive switch K1. Thermistor R30 is a positive temperature coefficient (PTC) thermistor to limit the amount of current passed through the telephone line 110 from the central office or PBX. Capacitor C20 and series resistor R27 shunt contacts of switch K1 for arc suppression when contacts in switch K1 open and close. Capacitor C20 and resistor R27 allow ringing potential from the central office to pass uninhibited while direct current from the central office or PBX is not allowed to pass through when switch K1 is deactivated. The RING wire of the telephone line 110 couples to terminal 264 of a bridge rectifier circuit 261 having diodes D6, D7, D8 and D9 while thermistor R30 couples to terminal 262 of the bridge rectifier circuit 261. The bridge rectifier circuit 261 produces a positive voltage on terminal 263 which couples to hook switch SW3 and a negative voltage on terminal 265 of the bridge rectifier circuit is coupled to ground regardless of the polarity of the telephone line 110 (e.g. during line reversal). Switch SW3$_a$ of switch-hook 102 (shown in the on-hook condition) couples signals from terminal 263 onto wire 275, and along with wire 276 which is coupled to ground, are coupled to LINE input of the interface network 113. Therefore, assuming the TIP wire is more positive than the RING wire, a complete loop from the TIP wire of the telephone line 110 couples through switch K1, if it is actuated, through thermistor R30, through diode D7, through switchhook switch SW3$_a$, then through wire 275 to interface network 113 back through wire 276 through diode D8 to the ring wire of the telephone line 110. If the RING wire was more positive than the TIP wire, (e.g. during line reversal) current would pass through diode D6, instead of diode D7, and through diode D9, instead of diode D8. Thus, regardless of input polarity, inputs labeled HANDSET to interface network 113 couple through mute network 114 to handset 101. Common handset input 277 returns signals from microphone 278 and earphone 279 in handset 101 back to the interface network 113. Muting of the microphone 278 cuts off completely the ability for the user to communicate through the coin operatd telephone until muting is released. Muting of the earphone 279 drastically reduces the received volume and is used, for example, when dialing a telephone number to the central office or PBX by DTMF or dial pulses. Muting network 114 is in series with the common handset input 277 and the microphone 278 and earphone 279. Output latch 211 in computer 111 provides two bits of data coupled over bus 260 to muting network 114. These two output bits, D0 and D1, drive inverting buffers 280 and 281, respectively. Inverting buffer 280 drives transistor Q6 which acts as a switch to allow current passing through earphone 279 in handset 101 to be coupled to interface network 113. Inverting buffer 281 drives transistor Q5 into conduction, acting as a switch by allowing current to pass from emitter to collector in transistor Q5, to allow current passing from interface network 113 to microphone 278 in handset 101. By way of example, if bit D0 coupled to inverting buffer 280 is low, then the output of inverting buffer 281 is high disabling Q6 such that the only current allowed to pass through earphone 279 is limited by resistor R32 to a low value. Conversely, if output bit D0 is high, then inverting buffer 280 drives transistor Q6 into conduction, to bypass resistor R32, thereby allowing full current to pass through earphone 279 so full volume is heard. Similarly, if output bit D1 is low, inverting buffer 281 inhibits transistor Q5 from conducting allowing no current to pass through microphone 278 in handset 101, thereby cutting off the microphone 278. If output bit D1 is high, then inverting buffer 281 drives transistor Q5 into conduction allowing current to flow in microphone 278 in handset 101 so voice communication can occur.

Ringing detector 121 indicates to computer 111 that a call is incoming by placing an incoming call signal on wire 266 which couples to input latch 209 in the computer 111. When a call is incoming, a ringing potential, a 20 Hz AC voltage, is applied to the TIP wire of the telephone line 110 from the central office or PBX passing through C20 and R27, through R30 to C21, to terminal 262, which is a DC blocking capacitor, into diode D5. The 20 Hz AC voltage that is rectified by diode D5 passes through current limiting resistor R28 and charges capacitor C19. After several cycles of the 20 Hz ringing voltage, capacitor C19 has a sufficient charge overcoming resistor R31 such that a logical "high" signal is impressed on wire 266. Resistor R29 guarantees that there is no residual DC voltage coupled through capacitor C21 due to leakage will appear across capacitor C19. Resistor R31 bleeds off any stored charge on C19 after ringing voltage has been removed. An optional ringer 120 parallels the telephone line 110 to provide an audible signal to the user that a call is incoming to the coin operated telephone 100.

Circuit 270 detects that a call originated by the user of the coin operated telephone 100 has been answered if the central office or PBX to which the coin operated telephone 100 couples to provide this service. If this service is provided, then a momentary line reversal, a momentary reversal of the potential applied across the telephone line 110 from the central office, appears across the telephone line 110 indicating that the called party has answered the call. The RING wire of the telephone line 110 couples to current limiting resistor R15, then to diode D3. Diode D3 allows only that battery reversal pulse to pass through it, then is filtered by C7 and R14 and clamped by diode D2 such that the voltage appearing across capacitor C7 never exceeds the power supply voltage that diode D2 couples to. That pulse then passes through resistor R13 by wire 247 to flip/flop 271 in computer 111 via wire 247. When line reversal occurs, flip/flop 271 is set and its Q output couples to input latch 209 for the microprocessor 201 to read. Flip/flop 271 is initialized, or cleared, by a signal on wire 272 which couples one bit from output latch 212 to the clear input on flip/flop 271. Not all central offices provide line reversal to indicate that the called party has answered. Therefore, a push-to-talk switch 106 is provided so that the user of the coin operated telephone 100 can indicate to the computer 111 that the called party has answered. This is necessary to determine if the deposited coins are to be collected, if the called party has answered, or otherwise returned. When push-to-talk switch 106 is actuated by the user, a logical "high" is coupled by the push-to-talk switch 106 via wire 142 to input latch 208. The response of the computer 111 to the actuation of push-to-talk switch 106, or to the indication by line reversal detector 270, of the called party answering will be discussed in detail below.

Coins deposited by the user into coin slot 103 fall first through a coin annunciator 285, Part Number 9964-3220, manufactured by Seiscor Technologies, Inc., which signals computer 111 the value of the deposited coins via bus 286. Coin annunciator 285 has three output bits, one bit for each type of coin deposited. For example, if no coin is deposited, its output is 000, if a nickel is deposited, the output is 001, if a dime is deposited, the output is 010, and if a quarter is deposited, the output is 100. It is noted that coin annunciator 285 could be modified to accept any type of coin denomination from any country. Once the deposited coin falls through coin annunciator 285 and coin path 132, it resides in escrow container 287. Escrow unit 138, having the escrow container 287 and an escrow motor 294, holds the deposited coins and under command of computer 111 via bus 139, transfers the deposited coins either to the coin box 107 or to the coin return slot 108. It is noted that signals on bus 139 in the present invention are similar to signals coupled to a coin operated telephone from a central office controlling operations of the telephone for the collection or returning of deposited coins. If the called party does not answer (or is busy), coins deposited are returned via coin return slot 108 or, if the called party answers and the push-to-talk switch is activated, the coins are retained in coin box 107. Computer 111 controls the collection or return of coins in the escrow 138 by signals carried over bus 139. Two output bits D00, D01 from bus 139 drive inverting buffers 292 and 291, respectively, which in turn drive latching relay K2. Inverting buffer 291 drives the return solenoid on latching relay K2 and inverting buffer 292 drives the collect solenoid on latching relay K2. The return or collect solenoids of latching relay K2 are pulsed at the end of the call. Diodes D12 and D13 protect inverting buffers 291 and 292, respectively, from over-voltage generated by the solenoids on latching relay K2. If the call is completed, then the collect solenoid would be pulsed and if the call was not completed, then the return solenoid would be pulsed. After a small delay, output D02, from bus 139, drives inverting buffer 293, to start the operation of escrow motor 294. Inverter 293 is only enabled for a short amount of time, long enough for escrow motor 294 to start its revolution thereby closing switch SW4 until its operation is completed, wherein SW4 will then open thereby disabling escrow motor 294. Relay K2 determines what direction escrow motor 294 will turn by switching polarity of the power applied to escrow motor 294. By having escrow motor 294 turn in one direction, coins residing in escrow container 287 would be returned, or if escrow motor 294 rotates in the opposite direction, then coins retained in escrow container 287 will be sent to coin box 107. Diode D14 protects inverting buffer 293 from over-voltages produced by escrow motor 294.

When the user of the coin operated telephone 100 lifts handset 101 off of switchhook 102, a "low" signal on wire 130 from switch SW3$_b$ opening and resistor R5 placing a "low" signal on wire 130, coupled to a TRIGGER input of pulse generator 290, enables reset circuitry 290 to generate a reset pulse on wire 291 which couples to clear input on the microprocessor 201 and is distributed to input latches 208, 209, output latches 210, 211, 212. Once computer 111 starts processing, a bit written into output latch 212 is coupled to an INHIBIT input on pulse generator 290 to inhibit further resets of the microprocessor 201. While so inhibited, when wire 130 goes high (e.g. when switchhook 102 is flashed) no reset pulses will be generated onto wire 291. This reset inhibit is removed when the call is terminated.

Figure 3:
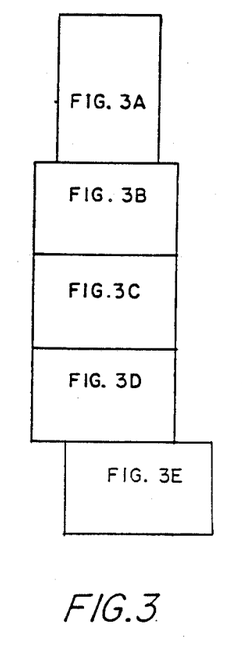
FIG. 3 diagrams the relationship between FIGS. 3A, 3B, 3C, 3D and 3E.
Figure 3A:
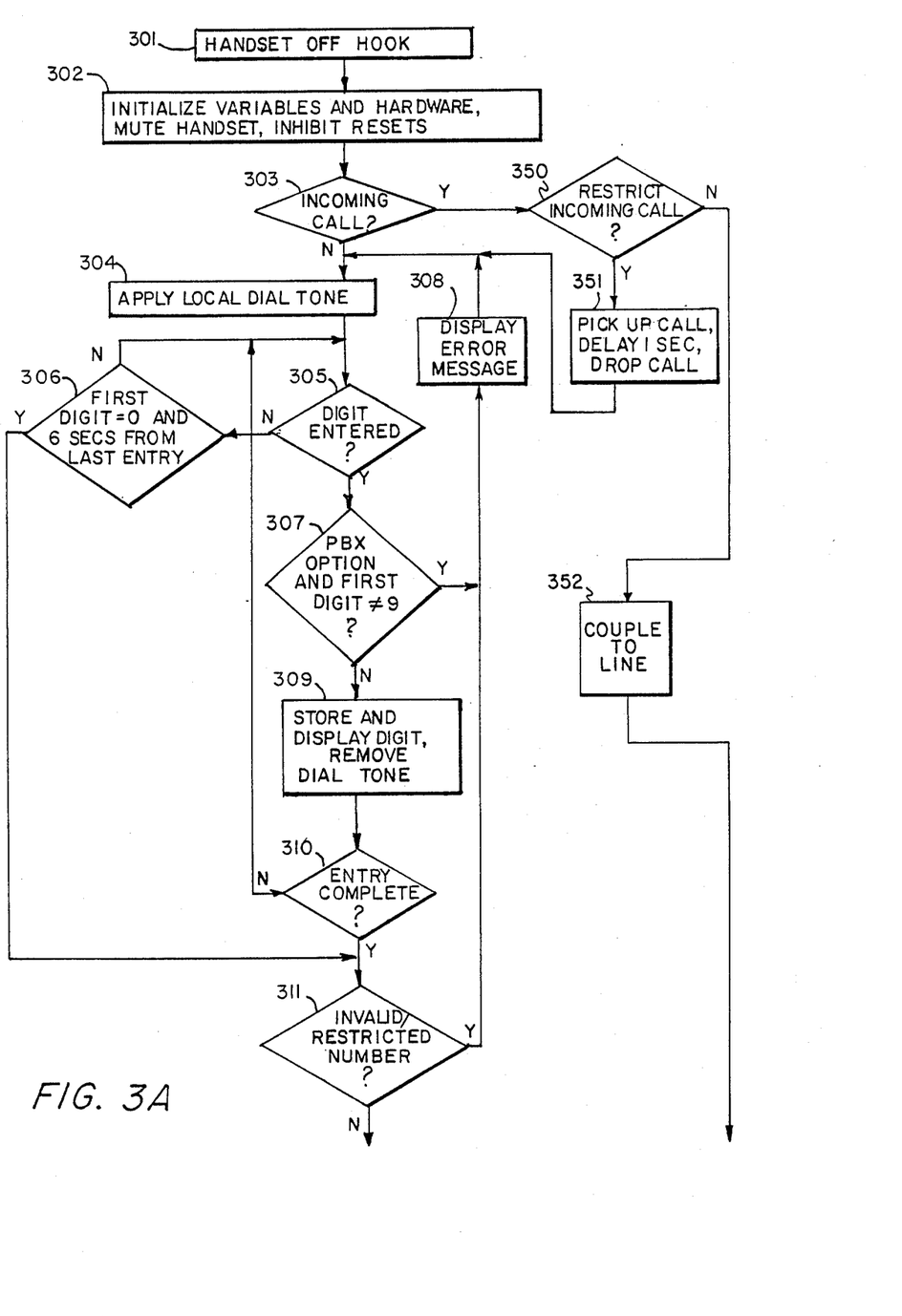
FIGS. 3A-3E are flow charts of software used in controlling a computer disposed within the coin operated telephone of FIG. 1.
Figure 3B:
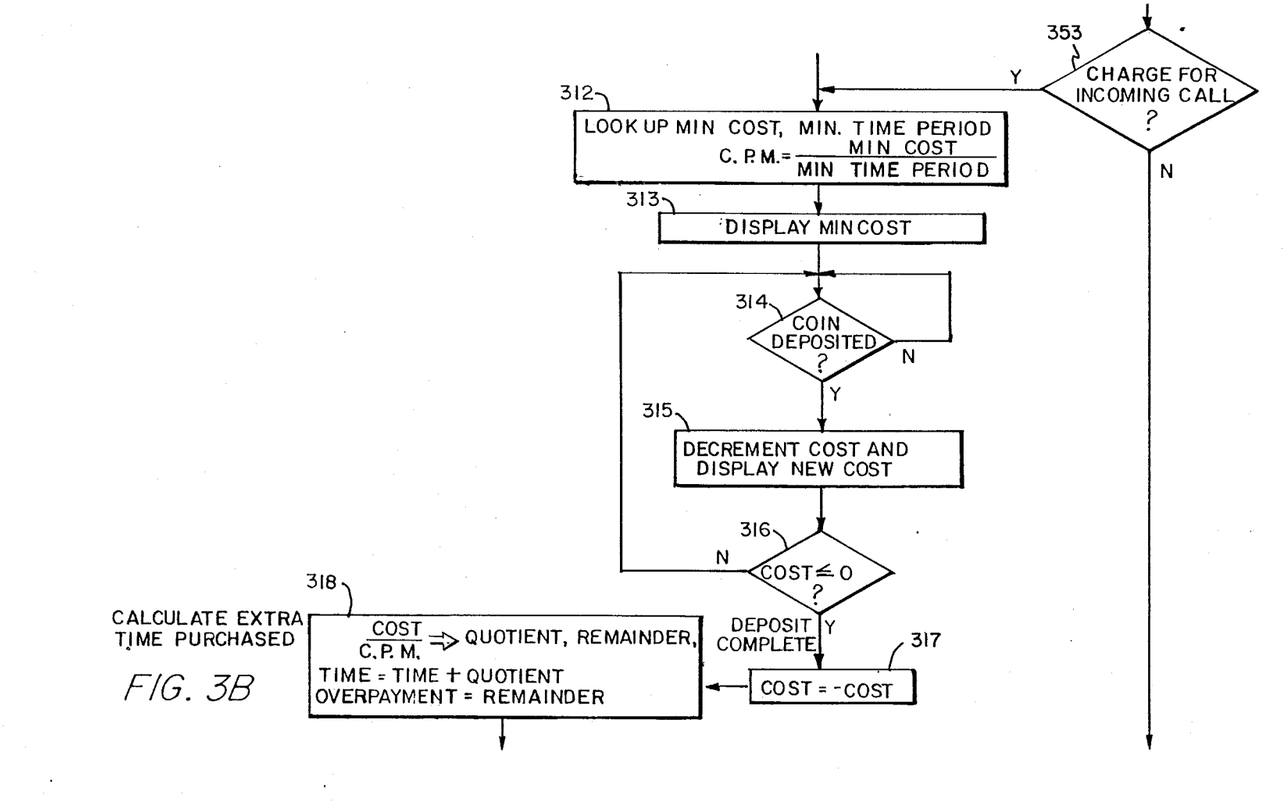

FIG. 3 diagrams the relationship between FIGS. 3A, 3B, 3C, 3D and 3E. FIG. 3, as a whole, flow charts the operation of coin operated telephone 100. The embodiment of this flow chart is stored in ROM 202 in computer 111 (FIG. 2). Starting with FIG. 3A, initiation of the operation of coin operated telephone 100 begins in step 301 by the user removing handset 101 from switchhook 102 (FIG. 2). The coin operated telephone 100 is then initialized, muting is enabled, resets are inhibited in step 302. Decision 303 determines when the user removed the handset 101 in response to an incoming call signal from ringing detector 121 (FIG. 1). Operation where there was an incoming call will be detailed below. Assuming no incoming calls, step 304 enables a locally generated dial tone from local dial tone generator 112 (FIG. 1) passing through switchhook SW3$_a$ through interface network 113, mute network 114, handset 101 to earphone 279. It is noted that switch K1 (FIG. 1) is not enabled, therefore, the locally generated dial tone is not coupled onto telephone line 110, nor is the central office signaled that a call is to be placed. Step 305 determines whether a digit has been entered into dial pad 105 (FIG. 1). Since at this point no digits have been entered, control passes to step 306, an "operator call" test, and failing this step causes control to pass back to step 305 in a loop. Once a digit has been entered, control falls to step 307 which determines if a PBX option has been enabled, and if it has, then the first digit must be a nine. If these conditions are not met, control passes to error display message step 308, and the system is reinitialized for more digits. If a PBX is not used (central office only) or if a PBX is used and the first digit was a nine (or any other access code to allow coupling to a central office), then step 307 would be satisfied and control passes to step 309 which stores the digit that was entered and displays that digit in display 104 so that the user can keep track of the number entered and local dial tone is removed. Step 310 looks at the digits that are entered and determines whether the entry is a complete telephone number. If it is not complete, then control passes back to step 305 for more digits to be entered. Once a digit has been entered, step 306, the "operator call" test, determines whether the first digit was a zero, and if it was a zero, whether six seconds have passed since the entry of that digit. If those conditions have been met, then it is assumed to be an operator call and no more digits will be accepted. Once a completed telephone number is entered, control passes from step 310, or from step 306 if an operator call is requested, to step 311 for testing the validity of that entered number or whether that number is restricted from being called. If it is an invalid or restricted number, then control passes to step 308 to display an error message back to the user on display 104 and the local dial tone is reapplied in step 304 and the system is reinitialized for more digits. If the number entered is a valid or unrestricted number, then control passes from step 311 to step 312 (FIG. 3B) to look up the minimum cost for that call and the minimum time period for that charge. This data is stored in ROM 202 (FIG. 2A). A cost per minute determination (C.P.M.) is computed by the minimum cost divided by the minimum time, which is used to calculate the extra cost needed for each additional minute of use by the user. Step 313 displays that minimum cost, determined in step 312, to the user on display 104. Step 314 waits for the user to deposit a coin. Once a coin has been deposited by the user into coin slot 103, then in step 315 the displayed cost, as determined by coin annunciator 285 (FIG. 2B), is decremented by the value of that coin and step 316 tests whether the cost that is displayed to the user is less than or equal to zero. If the cost is greater than zero, then more coins are needed to complete the call and control passes back to step 314 to wait for more coins to be deposited. Once the cost is less than or equal to zero, indicating exact or overpayment for the minimum cost of the call, control passes through step 317 making any overpayment value positive, if any, to step 318 which credits the user with an extra minute of time, or multiples thereof, if the excess amount of money deposited exceeds that of the cost per minute (C.P.M.) calculated in step 312. Note that if there is a credit that exceeds the cost per minute, then the quotient from the division will be in multiples of minutes to be credited and the remainder is credit for further minutes to be purchased and put in variable overpayment. Note that if credit equals zero or is less than the cost per minute, then the quotient equals zero (no extra time is credited) and the remainder is equal to cost, making overpayment equal cost. Control then passes to step 321 (FIG. 3C) which retests whether there was an incoming call as determined in step 303. Procedure of what happens if there was an incoming call will be detailed below. Assuming that there was no incoming call, control passes from step 321 to step 322 which couples to the telephone line 110, when switch K1 is closed, delays for two seconds so that the central office or PBX will be ready to accept digits, then start dialing the stored telephone number, entered by the user in step 305, to the central office by DTMF or dial pulse (pre-programmed to use either) and simultaneously displaying the number being dialed to the user on display 104. DTMF dialing is accomplished by DTMF dialer 117 sending tones through summer 135, capacitor C28, and switch K1 to the central office via telephone line 110 (FIG. 1). Once the dialing of the entered number to the central office is completed, step 323, determines whether the call is to be a free call (e.g., operator call, 911, etc.). If the call is a free call, control passes to step 325. If the call is not a free call, then control passes to step 359 which displays to the user on display 104 to press the push-to-talk button 106 (FIG. 1) when the called party answers. Step 360 tests whether the push-to-talk switch has been actuated, and if it has not, control passes to step 361 which determines if handset 101 is placed back on switchhook 102 indicating that the user wishes to terminate the call. If the handset is not on-hook, then control passes back to step 360 for testing for the push-to-talk switch to be actuated. If the push-to-talk switch is actuated, then control passes from step 360 to step 324. Note that step 358 can test for a line reversal from line reversal detector 270

Figure 3C:
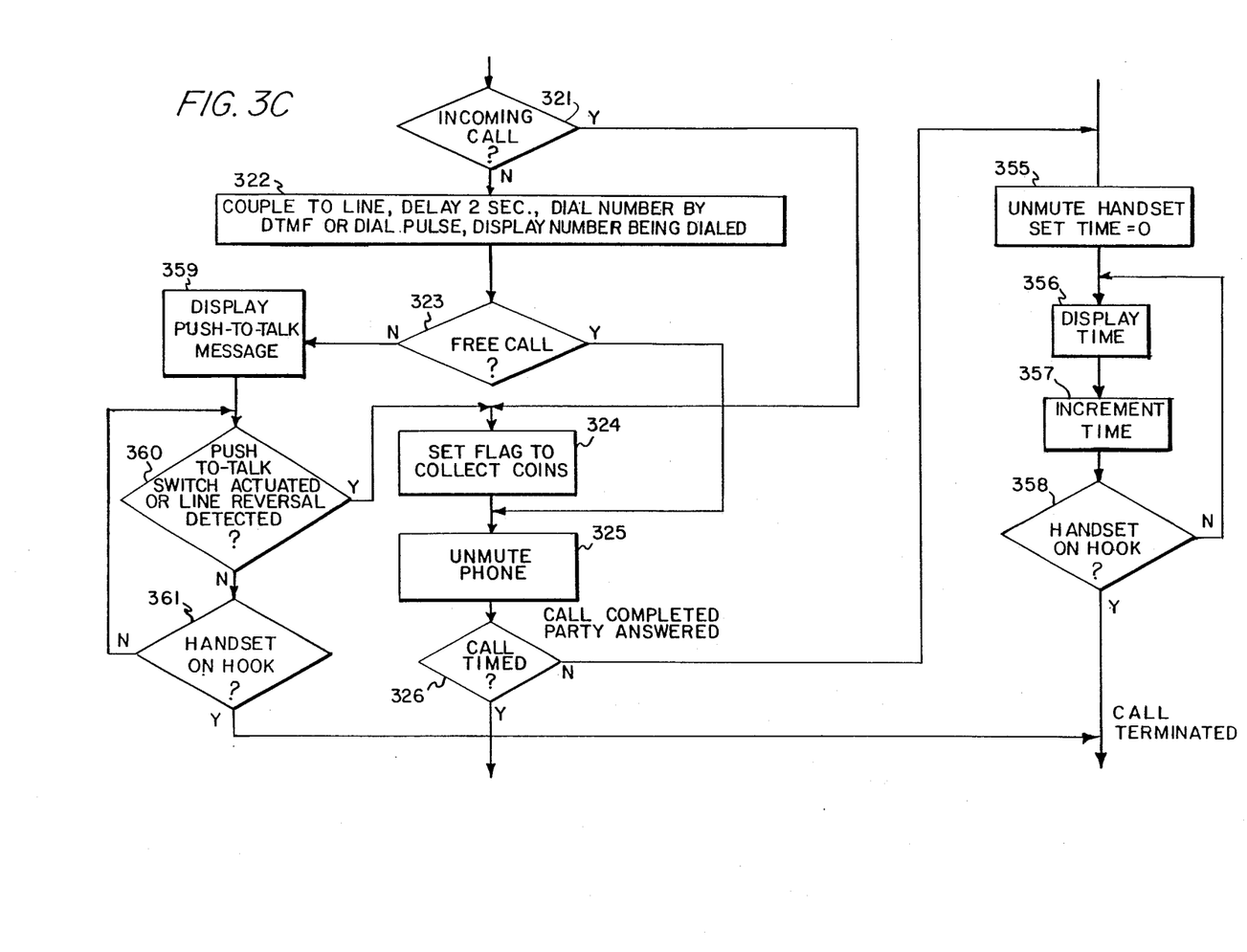
Figure 3D:
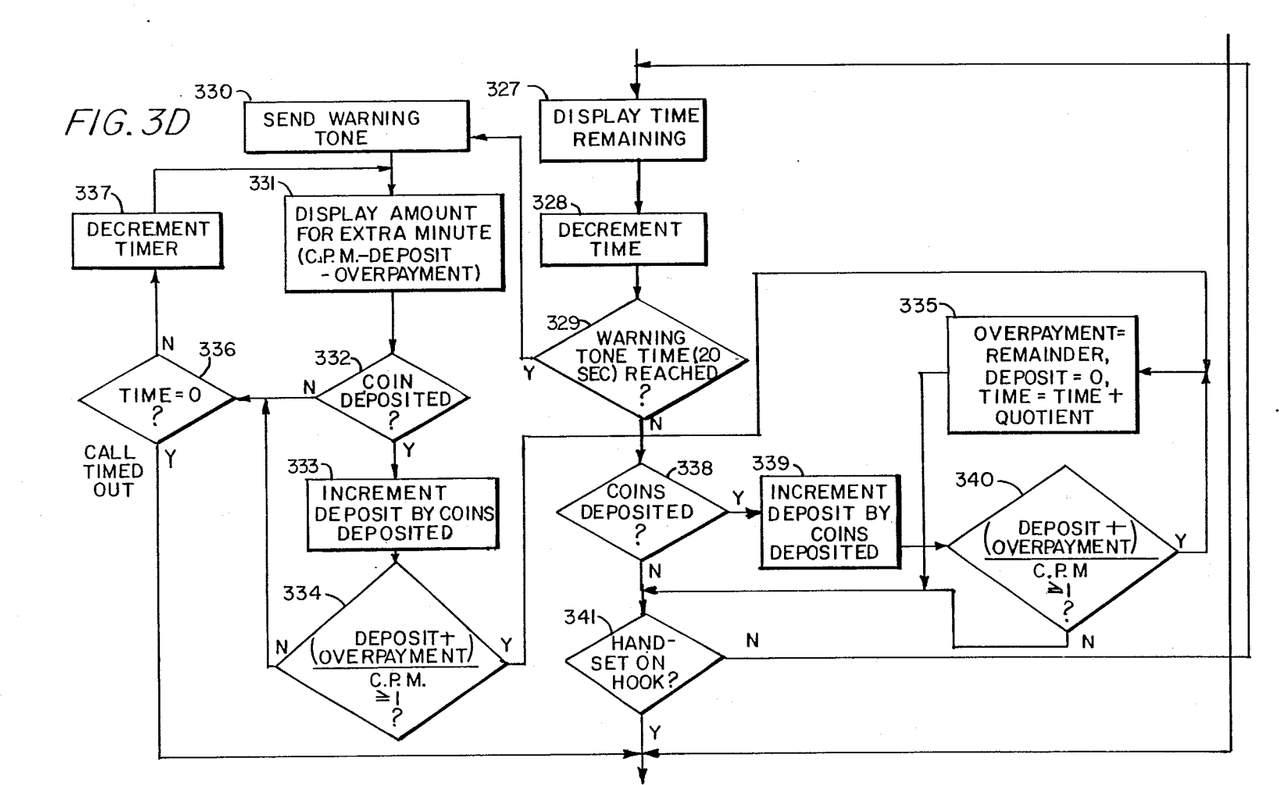

(FIG. 1) for detecting if the called party has answered, as well as test for actuation of the push-to-talk switch 106. If line reversal is used to detect the called party answering, then step 359 would not be used. Also, note that if the handset is determined to be on-hook in step 361, then the call is determined to be terminated. Step 324 sets a collect flag to indicate the coins that are deposited will be collected into coin box 107 (FIG. 1) at termination of the call. From step 324, step 325 unmutes the microphone 278 in handset 101 by disabling mute network 114 (FIG. 1) so that the user can talk to the answering party. Thus, for a free call as determined in step 323, no flag is set to collect coins and any coins deposited will be returned. Control then passes to step 326 that tests to see if the call is to be timed, i.e., whether time limits are to be set or unlimited time is allowed without extra charge. If the call is to be untimed, e.g., a local call, control passes to step 355 and is described below in association with answering an incoming call. If the call is to be timed, e.g., a long distance call, control passes to step 327 (FIG. 3D) to configure the display 104 to display the minimum time period from step 312 plus extra time purchased by the user in step 318 and step 328 starts decrementing the time displayed. Step 329 tests the time to see if 20 seconds remains so that a warning tone in step 330 would be sent to the user indicating that more coins are to be deposited to prevent the call from being terminated. Once the warning tone has been sent in step 330, in step 331 the display no longer indicates the time remaining, but flashes the amount to be deposited by the user for an extra minute. This is calculated by taking the cost per minute (C.P.M.) less any money deposited and less any overpayment as calculated in step 318. In step 332, a test is performed to see if any coins are deposited, and if so detected by coin annunciator 285, in step 333 the amount deposited increments the variable deposit by the coins deposited and in step 334 the deposit variable plus the overpayment is divided by the cost per minute (C.P.M.) to determine if the amount of overpayment plus deposit is enough to buy at least one minute of time. The quotient from that calculation in step 334, being greater than or equal to one, is used in step 335 to credit the user with the number of minutes purchased and the remainder from that calculation in step 334 is used as the overpayment as credit towards further minutes that are purchased and the deposit variable is reset to zero. If the quotient is less than zero from the calculation in step 334, then control passes to step 336 which determines if the time remaining equals zero, and if so, the call times out and is terminated by opening switch K1. If the time is greater than zero, control passes from step 336 to step 337 which updates the timer and control then passes back to step 331 to display the amount to be deposited. Returning to step 329, if the 20 second warning tone time limit has not been reached, control passes to step 338 to determine if during the call any coins have been deposited. If they have, then the deposit variable is incremented in step 339 and in step 340, a calculation identical to that as in step 334 occurs. If the quotient from the calculation in step 340 is greater than or equal to one (at least one minute has been purchased), control passes to 335 and the user is credited with the time purchased. If the quotient from the calculation in step 340 is less than one, no coins have been deposited in step 338, or time has been credited to the user in step 335, then control passes to step 341 to test whether the handset 101 is on-hook. If the handset is not on-hook, then control passes back to step 327 completing a loop while the user is talking to the answering party.

Returning back to step 303 (FIG. 3A), if an incoming call is detected by ringing detector 121 (FIG. 1), control passes from step 303 to step 350, which is pre-programmed whether to restrict any incoming calls or not. If incoming calls are restricted, i.e., no incoming calls are to be allowed, then control passes to step 351 which closes switch K1 to complete the incoming call for a predetermined amount of time, typically one second, then opening switch K1 to terminate the incoming call and control then passes to step 304 for origination of a call as described above. It is noted that if incoming calls are to be restricted, then ringer 120 (FIG. 2B) would not be coupled to the telephone line 110. If incoming calls are not to be restricted, then control passes from step 350 to step 352 to couple the coin operated telephone 100 to the line 110 by closing switch K1, thereby answering the incoming call. Control then passes to preprogrammed step 353 (FIG. 3B) which determines if a charge is to be made when answering an incoming call. Note that although the incoming call is answered, mute network 114 is enabled so that the user can hear the calling party but cannot transmit to the calling party. If there is a charge to be made, then control passes through steps 312 to 318 and 321 to look up that minimum charge and display that charge, so that when the user satisfies that charge, the muting network 114 (FIG. 1) will be disabled in step 325 or 355 allowing the user to speak to the calling party. In step 321, the test for an incoming call would be satisfied and control passes to step 324. Step 324 enables collection of coins and step 325 unmutes the microphone 278 in handset 101 if there is a charge for answering the incoming call. As described above in connection with originating a call, step 326 determines if the call is to be timed, and if so, control passes to step 327. If the call is not to be timed, i.e., no time limits, control passes to step 355. Therefore, the coin operated telephone 100 can be configured to allow a minimum charge to answer the call (e.g. a quarter) with or without a minimum time period. For an untimed call, step 355 (FIG. 3C) unmutes the microphone 278 in handset 101 (FIG. 2) so that the user can talk to the calling party and the timer is set to zero. Step 356 displays the timer to the user on display 104. Step 357 increments the timer and control then passes to step 358 which tests if the handset 101 is on-hook. If the handset is not on-hook, control passes back to step 356 to update the displayed time. This loop continues until the handset is on-hook which causes control to pass from step 358 to step 342 (FIG. 3E) where the call is terminated. It is noted that there is no time restriction on this type of call.

Figure 3E:
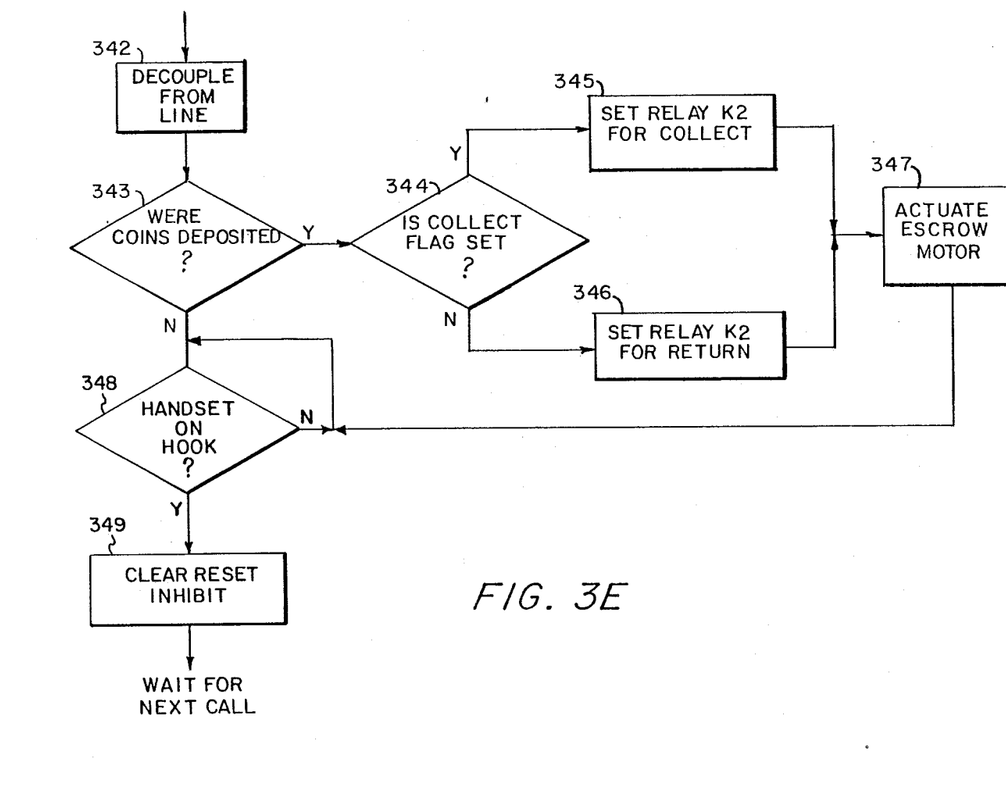

If the handset 101 is determined to be on-hook in steps 361, 358 (FIG. 3C) or step 341 (FIG. 3D), or time remaining equals zero in step 336 (FIG. 3D), then the call is terminated by decoupling from the telephone line 110 when switch K1 is opened (FIG. 1) in step 342 (FIG. 3E). Control then passes to step 343 which checks to see if any coins were deposited and, if so, then in step 344 the collect flag set in step 326 is tested to see if it was set and, if so, control passes to step 345 which sets relay K2 (FIG. 2) to collect the coins deposited. If the collect flag is not set, then control passes to step 346 which sets relay K2 (FIG. 2B) to return coins deposited. Control then passes from either steps 345 or 346 to step 347 which actuates the escrow motor 294 (FIG. 2B) to return or collect the coins deposited. From step 347, or from step 343, if no coins were deposited, control passes to step 348 which checks to see if the handset 101 is on switchhook 102. When step 348 is satisfied, control passes to step 349 which removes the inhibit on further resets, and the computer 111 waits for the next call.

Having described preferred embodiments of this invention, it will now be apparent to one of skill in the art that other embodiments incorporating its concept may be used. It is felt, therefore, that this invention should not be restricted to the disclosed embodiments, but rather should be limited only by the spirit and scope of the appended claims.

What is claimed is:

1. A pay telephone comprising:
  a handset having a speaker;
  a switchhook for receiving a handset and for enabling removal of the handset from the switchhook;
  a dial tone generator disposed within the pay telephone; and
  means for coupling the dial tone generator to the speaker when the handset is removed from the switchhook.

2. Apparatus as in claim 1 additionally comprising:
  means for entering a telephone number of a called party;
  means for calculating a charge for the call, coupled to the telephone number entering means; and
  means for enabling coupling of the pay telephone to a telephone line after a payment equal to the charge is deposited by a user.

3. A pay telephone comprising:
  means for generating a local dial tone, located within the pay telephone;
  means for coupling the dial tone to a speaker, and thus for prompting a user to enter a telephone number of a party to be called;
  means for entering the telephone number;
  means for calculating a charge for the call as a function of the entered number;
  means for indicating the charge to the user;
  means for accepting a fee equal to the charge; and
  means for coupling to a telephone line after accepting the fee.

4. A pay telephone comprising;
  a handset;
  a switchbook;
  means for detecting removal of the handset from a switchhook;
  means for generating a dial tone, disposed within the telephone, upon detecting removal of the handset;
  means for accepting payment; and
  means for subsequently coupling the telephone to a telephone line.

5. Apparatus as in claim 4 comprising:
  means for accepting a telephone number; and
  means for calculating payment due, disposed within the telephone.

6. A method of operating a pay telephone comprising:
  activating a local dial tone generator disposed within the telephone;
  coupling the dial tone generator to a speaker;
  accepting a telephone number of a party to be called;
  calculating a charge for the call as a function of the telephone number;
  accepting payment equal to the charge; and
  coupling the telephone to a telephone line.

* * * * *

UNITED STATES PATENT AND TRADEMARK OFFICE
CERTIFICATE OF CORRECTION

PATENT NO. : 4,768,227

DATED : August 30, 1988

INVENTOR(S) : Lee V. Dively and Jack M. Grubbs

It is certified that error appears in the above-identified patent and that said Letters Patent is hereby corrected as shown below:

In the Title: change "Coil" to -- Coin --;

Col. 3, line 19: change "comple.te" to
-- complete --.

Signed and Sealed this

Thirty-first Day of October, 1989

Attest:

DONALD J. QUIGG

*Attesting Officer*  *Commissioner of Patents and Trademarks*